United States Patent [19]

Welch

[11] 3,981,081
[45] Sept. 21, 1976

[54] LENS MEASURING INSTRUMENT

[76] Inventor: Richard J. Welch, 33 Gloria St., Windsor, Conn. 06111

[22] Filed: May 5, 1975

[21] Appl. No.: 574,359

[52] U.S. Cl. .......................... 33/174 A; 33/147 T; 33/200
[51] Int. Cl.² .......................................... G01B 5/00
[58] Field of Search .............. 33/174 A, 200, 147 R, 33/147 T, 143 R

[56] References Cited
UNITED STATES PATENTS

| | | | |
|---|---|---|---|
| 2,088,914 | 8/1937 | Long | 33/174 A |
| 2,535,633 | 12/1950 | Hobbs | 33/174 A |
| 3,050,860 | 8/1962 | Kosh | 33/174 A |
| 3,447,244 | 6/1969 | Scholl | 33/147 T |
| 3,457,652 | 7/1969 | Moffett | 33/174 A X |

Primary Examiner—William D. Martin, Jr.
Attorney, Agent, or Firm—McCormick, Paulding & Huber

[57] ABSTRACT

A lens measuring instrument has a transparent base plate which includes upper and lower lens supporting surfaces. A generally L-shaped measuring member supported for movement on the base and across the upper surface thereof has a measuring surface movable toward and away from an opposing first reference surface which projects above the upper surface of the base and against which a peripheral edge portion of a lens supported on the base may be abutted. A second reference surface projects below the lower surface and provides an abutment for a peripheral edge portion of a lens supported by the lower surface. The first and second reference surfaces lie in a common plane normal to the upper and lower surfaces of the base. A dial indicator operably connected to the measuring member and indicia of linear measurement carried by the measuring member provide means for indicating the position of the measuring surface relative to the first and second reference surfaces. Means is also provided for orienting a lens supported by one of the supporting surfaces in predetermined position relative to the reference surfaces.

15 Claims, 6 Drawing Figures

LENS MEASURING INSTRUMENT

BACKGROUND OF THE INVENTION

This invention relates in general to a lens measuring instrument and deals more particularly with an improved instrument for determining the box dimensions of a spectacle lens or the like and for measuring segments or determining other critical lens dimensions.

Spectacle lenses are provided in a variety of shapes and for convenience in fitting such lenses a boxing method has been adopted wherein the various dimensions of a lens are related to the horizontal and vertical dimensions of a rectangle circumscribing the lens, as is well known in the art. It is generally essential that these dimensions be accurately determined to enable selection of a properly sized lens and to measure or locate the position of segments and other major points or lines of reference thereon essential to the proper finishing of the lens.

Accordingly, it is the general aim of the present invention to provide an improved measuring instrument for determining the box dimensions of a lens and for measuring the position of segments or other critical points or lines of reference on a lens.

SUMMARY OF THE INVENTION

In accordance with the present invention, a lens measuring instrument is provided which comprises a base having at least one substantially planar surface for supporting a lens and means defining at least one reference surface fixed relative to the base and against which an associated portion of the peripheral edge of the lens supported on the base may be abutted. Means is provided for orienting the lens in a predetermined position on the base and relative to the reference surface. A measuring member supported on the base for movement in one and an opposite direction relative thereto has a measuring surface thereon in parallel and opposing relation to the reference surface for movement into abutting engagement with an associated peripheral edge of a lens supported on the base. Means is provided for indicating the position of the measuring surface relative to the reference surface. The measuring member may comprise a generally L-shaped member which includes a beam, supporting the member for movement relative to the base, and a measuring jaw projecting from one end of the beam and defining the measuring surface. The base may comprise a transparent plate which has substantially parallel upper and lower lens support surfaces and at least one fixed reference surface associated with each lens support surface for cooperation with the measuring surface to facilitate various lens measurements.

DETAILED DESCRIPTION OF THE PREFERRED EMBODIMENT

Figure 1:
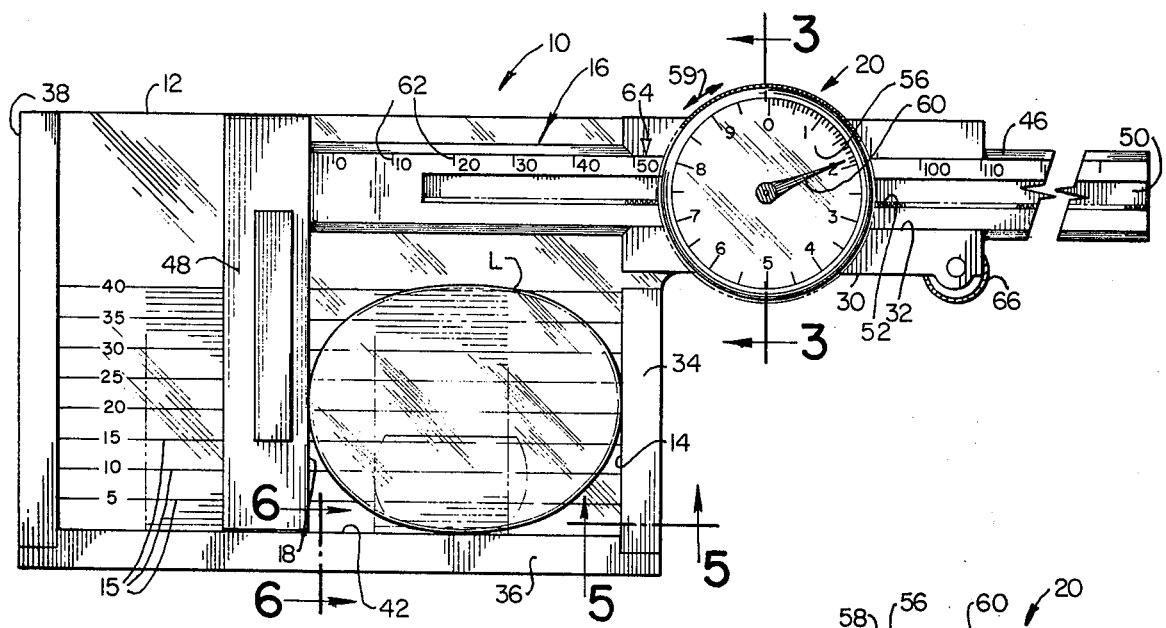
FIG. 1 is a fragmentary plan view of a lens measuring instrument embodying the present invention and shows the instrument as used to measure a box dimension of a typical spectacle lens.
Figure 2:
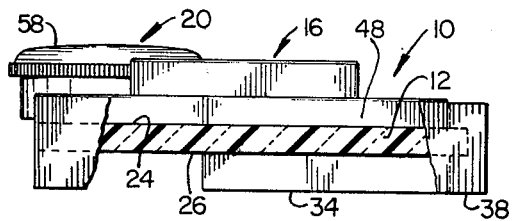
FIG. 2 is a left end elevational view of the lens measuring instrument of FIG. 1.
Figure 3:
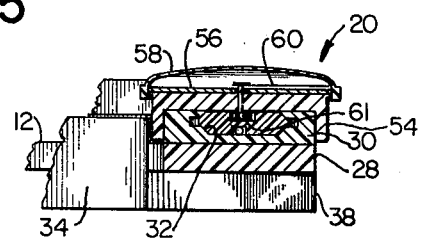
FIG. 3 is a fragmentary sectional view taken along the line 3—3 of FIG. 1.
Figure 4:
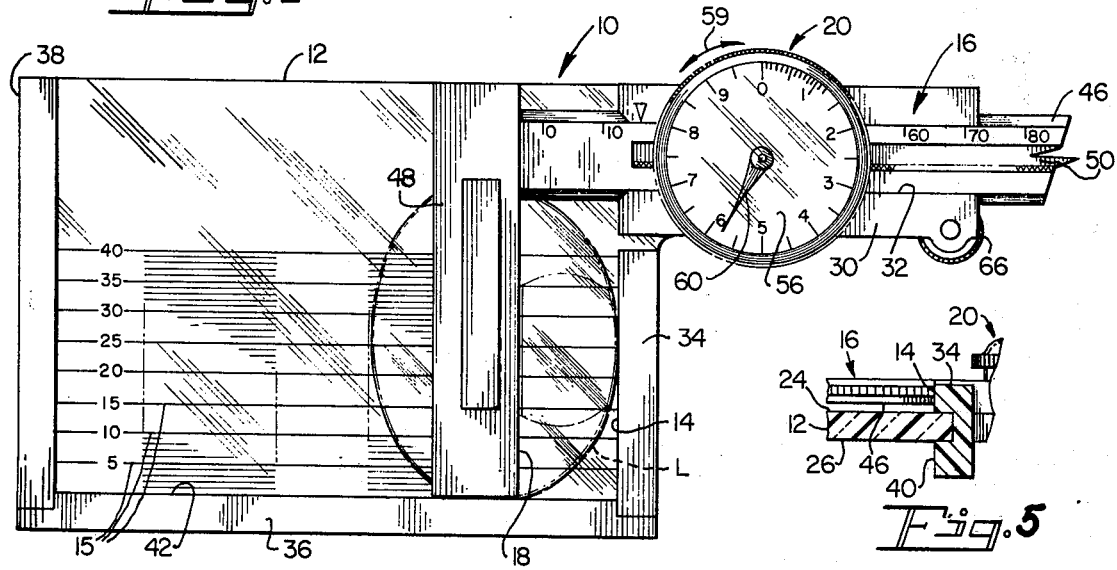
FIG. 4 is a fragmentary plan view similar to FIG. 1 but shows the instrument as used to measure a segment of a bifocal spectacle lens.

A lens measuring instrument illustrated in FIGS. 1–5, inclusive, and indicated generally by the reference numeral 10 is particularly adapted for measuring an ophthalmic lens such as the spectacle lens designated by the letter L in FIGS. 1 and 4. The instrument 10 generally comprises a base 12 which has a surface for supporting the lens L and at least one reference surface such as the surface 14 fixed relative to the base and against which an associated portion of the peripheral edge of the lens L may be abutted. Parallel reference lines 15, 15 on the base 12 facilitate orientation of the lens L relative to the reference surface 14, as will be hereinafter discussed. A measuring member 16 supported on the base 12 for movement in one and an opposite direction relative thereto has a measuring surface 18 maintained in parallel and opposing relation to the reference surface 14 for movement into abutting engagement with an associated peripheral edge portion of the lens L. Indicia of linear measurement carried by the movable measuring member 16 and a dial indicator, designated generally by the numeral 20, mounted on the base 12 and operably connected to the measuring member 16, indicate the linear distance between the measuring surface 18 and the reference surface 14.

Considering now the instrument 10 in further detail, the base 12 preferably comprises a transparent plate made from plastic material which includes a generally rectangular lens supporting portion which has parallel upper and lower lens support surfaces 24 and 26, respectively. The base 12 has an integral leg 28 which extends outwardly from its lens supporting portion. A guide block 30 mounted on the leg 28 has an outwardly opening track or way 32 formed therein which extends in a longitudinal direction.

Figure 5:
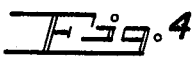
FIG. 5 is a fragmentary sectional view taken along the line 5—5 of FIG. 1.
Figure 6:
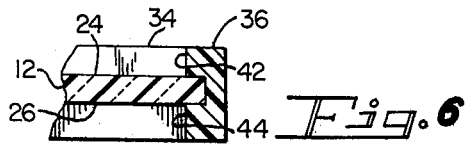
FIG. 6 is a fragmentary sectional view taken along the line 6—6 of FIG. 1.

Rectangular strips of plastic material 34, 36 and 38 secured to three edges of the base 12 extend above and below the upper and lower surfaces 24 and 26, respectively, generally bound three sides of the lens supporting portion of the base 12 and serve to support the instrument 10 when it is placed on a table surface or the like. The strip 34 defines the substantially planar reference surface 14 which projects above and is generally normal to the upper surface 24. The strip 34 also defines a second reference surface 40 which projects below and is generally normal to the lower surface 26. It should be noted that the reference surface 14 and 40 lie within a common plane, as shown in FIG. 5. In like manner the strip 36 defines a third reference surface 42 which projects above and is normal to the upper surface 24 and the reference surface 14. The strip 36 further defines a fourth reference surface 44 which projects below the lower surface 26 and which is disposed in a common plane with the reference surface 42, as best shown in FIG. 6. The reference lines 15—15 are preferably scribed or otherwise imprinted on the upper surface 24 and comprise graduations of linear measurement from a zero line which lies in the plane of the reference surfaces 44 and 42. In the illustrated embodiment 10, the reference lines 15, 15 are graduated at 5 millimeter intervals.

The measuring member 16 comprises an L-shaped member which includes a beam 46 and a measuring jaw 48 which projects from one end of the beam. The beam 46 is slidably received in and has a cross-sectional configuration which generally complements the way 32. An upwardly opening slot 50 formed in the beam 46 extends longitudinally thereof. One edge of the slot 50 is defined by a rack 52. The dial indicated 20 has a body 54 mounted in fixed position on the guide block 30 and further includes a graduated dial 56 mounted in fixed position on a transparent plastic cover 58 supported for rotation on and relative to the indicator body 54, as indicated by the directional arrow 59 in FIGS. 1 and 4. A pointer 60 journalled on the body 54 for rotation relative to the dial 56 is driven by a pinion 61 which engages the rack 52, as best shown in FIG. 3. Indicia of linear position 62, 62 along one edge of the beam 46 cooperates with a fixed reference pointer 64 on the guide block 30 to indicate the approximate position of the measuring surface 18 relative to the reference surface 14. Further indication of the relative position of the measuring surface or distance between the measuring surface 18 and the reference surface 14 is indicated by the dial indicator 20. In the illustrated embodiment the graduations 62, 62 are spaced at 10 millimeter intervals whereas the graduations on the indicator dial are spaced at 0.1 millimeters. One full revolution of the pointer 60 indicates a 10 millimeter linear movement of the measuring member 16. A serrated thumb wheel 66 journalled on the guide block 30 engages an associated side edge of the beam 46 for moving the measuring member 16 relative to the base 12.

Before positioning a lens on the instrument for measurement, the measuring surface is moved into abutting engagement with the reference surface 14. The indicator dial cover 58 is then rotated relative to the indicator body 54 to position the zero reference mark on the dial in alignment with the pointer 60. Thereafter, the dimensions of a lens measured by the instrument 10 may be read directly from the instrument.

Considering now the manner in which the instrument 10 is employed to measure a box dimension of a typical spectacle lens, such as a lens L, and referring particularly to FIG. 1, the lens is placed on the upper surface 24 with one edge thereof in abutting engagement with the reference surface 14. The 0–180 meridian of the lens is then aligned in parallel relation with the reference lines 15, 15. A lens former which corresponds to the lens L may be used to aid in accurately positioning the lens L on the support surface 24. The lens former (not shown) which corresponds to the lens L has a shape identical to the shape of the lens L, but may be of a slightly different size. Normally, such a lens former also has a series of holes therethrough which are used in positioning it on a lens grinding machine and which lie along its 0–180 meridian. The lens former is supported on the base in engagement with the lower surface 26 and with its 0–180 meridian, as indicated by the holes therein, in parallel alignment with one of the reference lines 15—15. The lens former is then held in the latter position and viewed through the lens L and the base 12 while the lens L is positioned with its peripheral edge in concentric alignment with the peripheral edge of the lens former. The measuring surface 18 is then brought into abutting engagement with an associated peripheral edge portion of the lens, as shown in FIG. 1, whereupon the major axial dimension of the lens may be read from graduations on the beam and dial indicator 20. The instrument 10, as it appears in FIG. 1, indicates that the box dimension of the lens L measures 51.8 millimeters.

The illustrated lens L is a bifocal lens and has a segment which may be read directly and with a relatively high degree of accuracy by positioning the lens on the upper surface 24 with an associated portion of its peripheral edge in engagement with the reference surface 42 substantially as shown in FIG. 1. The graduations which comprise the reference lines 15, 15 may then be viewed directly through the lens.

FIG. 4 illustrates another method for measuring the segment of the lens L or other points of reference on such a lens. The lens L is positioned below the base 12 and in supporting engagement with the lower surface 26 in abutting engagement with the reference surface 40. The measuring member 16 is then adjusted to visually align the edge of the segment with the measuring surface 18, as shown in FIG. 4, after which the instrument may be read. In like manner, other reference points on the lens may be measured.

I claim:

1. A lens measuring instrument comprising a transparent base having a substantially planar parallel upper and lower lens supporting surfaces, means defining a substantially planar first reference surface fixed relative to said base and projecting above said upper surface and against which an associated portion of the peripheral edge of a lens supported by said upper surface may be abutted, means defining a second reference surface fixed relative to said base and projecting below said lower surface in normal relation thereto and against which an associated peripheral portion of a lens supported by the lower surface may be abutted, said first and second reference surfaces being disposed in a common plane, means for orienting a lens in a predetermined position on said base and relative to said first reference surface, a generally L-shaped measuring member supported on said base for movement longitudinally thereof in one and an opposite direction, said measuring member having a longitudinally extending beam and a measuring jaw projecting from one end of said beam, said measuring jaw having a substantially planar and transversely disposed measuring surface projecting above said upper surface in parallel and opposing relation to said first reference surface for movement into abutting engagement with an associated portion of the peripheral edge of a lens supported by said upper surface, supporting means on said base engaging said beam and supporting said measuring member for movement in said one and said opposite longitudinal direction, and means associated with said beam for indicating the position of said measuring surface relative to said first reference surface.

2. A lens measuring instrument as set forth in claim 1 wherein said orienting means comprises a plurality of reference lines of said base normal to said first reference surface.

3. A lens measuring instrument as set forth in claim 1 wherein said indicating means comprises a dial indicator having indicating means movable in response to movement of said measuring means.

4. A lens measuring instrument as set forth in claim 3 wherein said beam has a rack thereon and said dial indicator includes an indicating dial having indicia of linear measurement thereon and a pointer assembly including a rotatable pointer journalled for rotation relative to said dial and a pinion operably connected to said rotatable pointer and engaging said rack.

5. A lens measuring instrument as set forth in claim 4 wherein said dial indicator has a body mounted in fixed position relative to said base and said indicator dial is supported for rotation on said body and about an axis coincident with the axis of said pointer.

6. A lens measuring instrument as set forth in claim 3 wherein said indicating means further comprises a reference pointer fixed relation to said base and indicia of linear measurement carried by said measuring member for movement therewith and relative to said reference pointer.

7. A lens measuring instrument as set forth in claim 1 including means defining a substantially planar third reference surface fixed relative to said base and projecting above said upper surface and normal to said first reference surface.

8. A lens measuring instrument comprising a transparent base plate having substantially planar parallel upper and lower surfaces, means defining a first reference surface fixed relative to said base and projecting above said upper surface in normal relation thereto and against which an associated portion of the peripheral edge of a lens supported by said upper surface may be abutted, means defining a substantially planar second reference surface fixed relative to said base and projecting below said lower surface in normal relation thereto and against which an associated portion of the peripheral edge of a lens supported by said lower surface may be abutted, said first reference surface and said second reference surface being disposed in a common plane, means for orienting a lens in a predetermined position relative to said base plate, a measuring member supported on said base for movement in one and an opposite direction relative thereto, said measuring member having a substantially planar measuring surface projecting above said upper surface in parallel opposing relation to said first reference surface, said measuring surface being movable toward and away from said first reference surface in parallel relation thereto, and means for indicating the position of said measuring surface relative to said first reference surface.

9. A lens measuring instrument as set forth in claim 8 including means defining a third reference surface fixed relative to said base and projecting above said upper surface in normal relation to said first reference surface and said upper surface.

10. A lens measuring instrument as set forth in claim 9 including means defining a fourth reference surface projecting below said lower surface and disposed in a common plane with said third reference surface.

11. A lens measuring instrument as set forth in claim 8 wherein said indicating means comprises a reference pointer fixed relative to said base and indicia of linear measurement carried by said measuring member and movable therewith and relative to said reference pointer.

12. A lens measuring instrument as set forth in claim 11 wherein said indicating means further comprises a dial indicator generally operably connected to said measuring member.

13. A lens measuring instrument as set forth in claim 12 wherein said measuring member comprises a generally L-shaped member having a beam carrying said indicia of linear measurement and a measuring jaw extending from one end of said beam and defining said measuring surface.

14. A lens measuring instrument as set forth in claim 1 including means for moving said measuring member relative to said base.

15. A lens measuring instrument comprising a transparent base having substantially planar parallel upper and lower surfaces, means defining at least two lens reference surfaces including a first reference surface fixed relative to said base and projecting above said upper surface in normal relation thereto and a second reference surface fixed relative to said base and projecting below said lower surface in normal relation thereto and against which an associated portion of the peripheral edge of a lens supported by said lower surface may be abutted, said first reference surface and said second reference surface being disposed in a common plane, a measuring member supported on said base for movement in one and an opposite direction relative thereto, said measuring member having a measuring surface disposed in generally parallel opposing relation to one of said lens reference surfaces, said measuring surface being movable toward and away from said one reference surface in parallel relation thereto, and means for indicating the position of said measuring surface relative to said one reference surface.

* * * * *